UNITED STATES PATENT OFFICE.

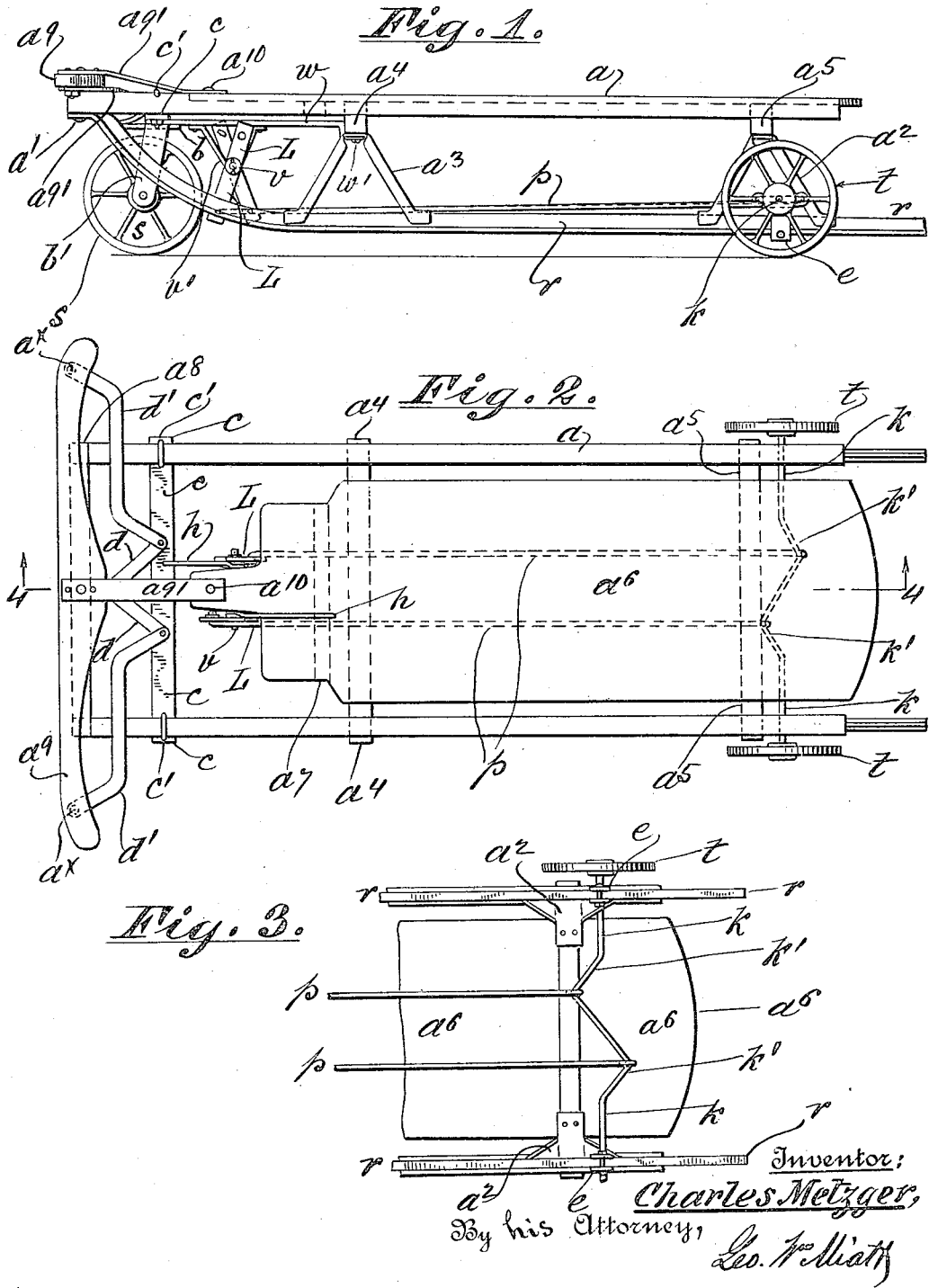

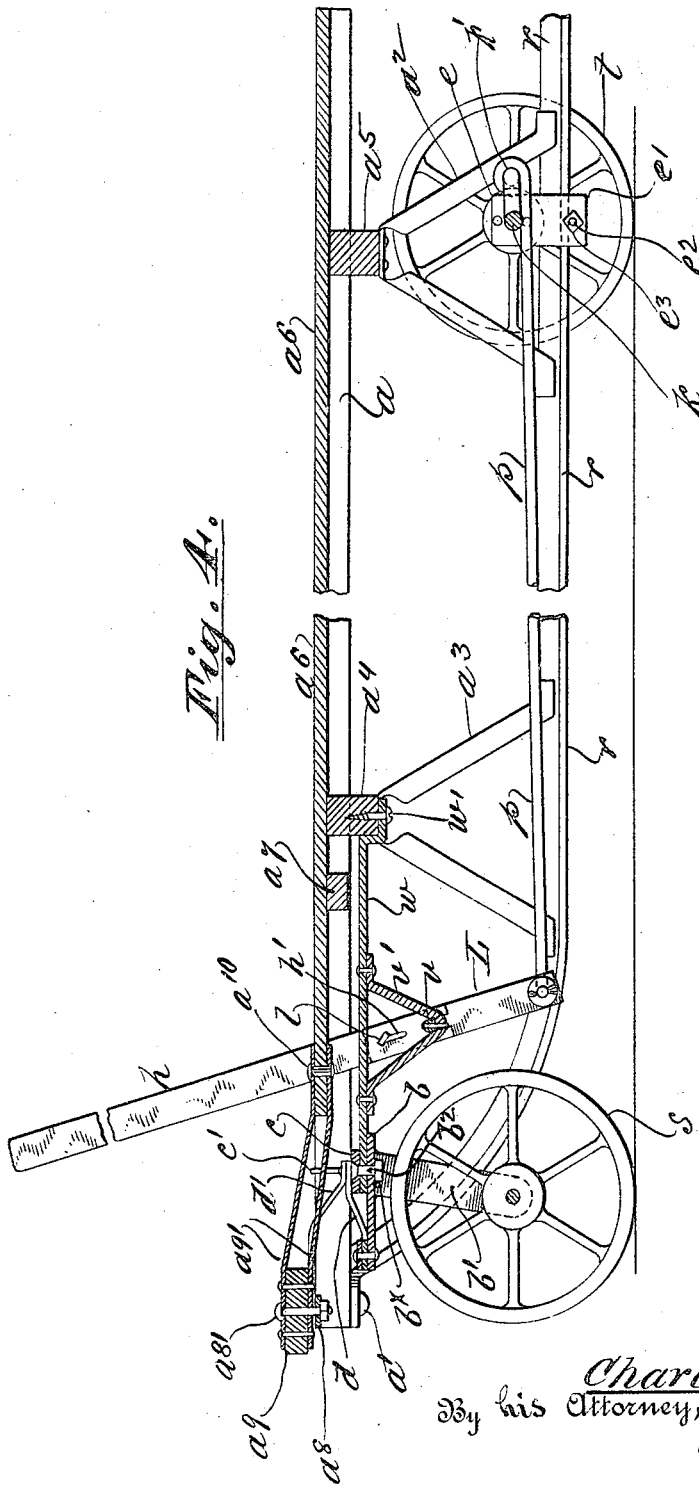

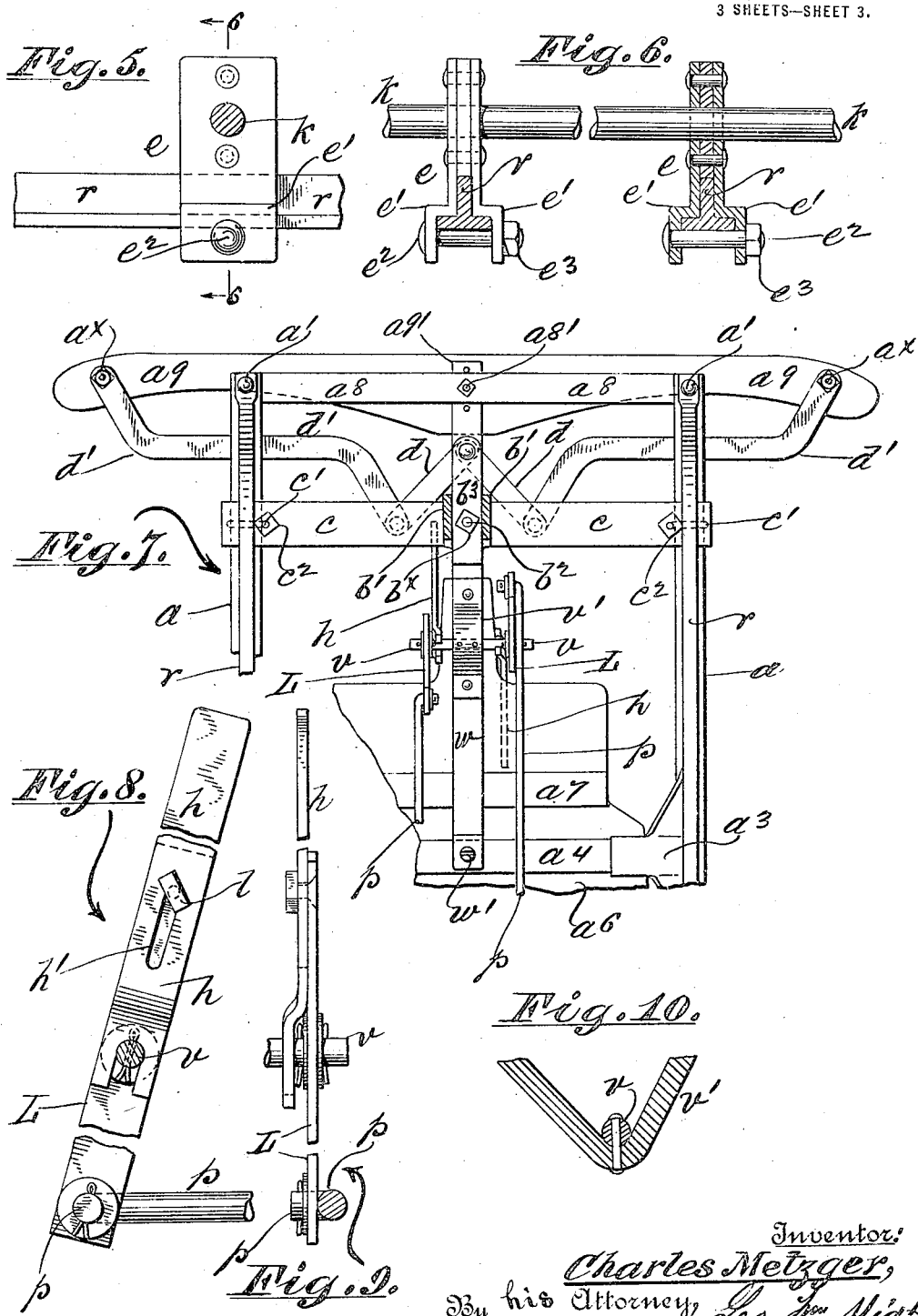

CHARLES METZGER, OF YONKERS, NEW YORK, ASSIGNOR OF ONE-THIRD TO LOUIS LEICHT AND ONE-THIRD TO JOHN WALTER, BOTH OF YONKERS, NEW YORK.

SLED ATTACHMENT.

1,410,701.       Specification of Letters Patent.     Patented Mar. 28, 1922.

Application filed February 24, 1921. Serial No. 447,531.

*To all whom it may concern:*

Be it known that I, CHARLES METZGER, a citizen of the United States, and a resident of Yonkers, county of Westchester, and State of New York, have invented certain new and useful Improvements in Sled Attachments, of which the following is a specification.

The object of my invention is to afford simple but effective means whereby a sled of ordinary construction may be readily converted into a wheeled vehicle or coaster, so that the sled, as a basic structure, may be available and utilized at all seasons of the year. To this end the invention consists, in the combination with the sled, of the specific construction and arrangement of parts and appliances herein described and claimed, distinctive features being the method of mounting the wheels, effecting propulsion, steering, etc., all as hereinafter fully set forth.

In the accompanying drawings,

Fig. 1, is a side elevation of a sled equipped with my attachments;

Fig. 2, is a top view thereof;

Fig. 3, is a view of the under side of the rear portion of the sled, showing the driving shaft, etc.;

Fig. 4, is a central longitudinal section, upon a larger scale the better to show the construction, taken upon plane of line 4—4, Fig. 2;

Fig. 5, is a cross section of the rear or drive shaft showing a side elevation of one of the shaft bearings;

Fig. 6, is a cross section of the sled runners taken behind the rear drive shaft, and through one of the bearings therefor, on plane of line 6—6, Fig. 5:

Fig. 7, is a view on the same scale as Fig. 4, showing the under side of the forward part of the sled, steering means, etc.;

Fig. 8, is a detail in side elevation of one of the propelling levers, broken away in part;

Fig. 9, is a view taken at right angles to Fig. 8, of the parts shown therein;

Fig. 10, is a sectional detail of the lever fulcrum and support.

Although I do not confine the application of my improvements thereto, nor to any other type of sled in particular, I have herein illustrated a practical embodiment of my invention adapted for attachment to and use upon a sled of the flexible flyer type, so called commercially, and well known in the state of the art.

The forward ends of the runners $r$, $r$, are secured to the longitudinal members $a$, $a$, of the sled frame by studs $a'$, $a'$, or equivalent means. Said runners $r$, $r$, are also attached to the side members $a$, $a$, by rear trusses $a^2$, $a^2$, and medial trusses $a^3$, $a^3$, indirectly through the medium of the frame cross members $a^4$, $a^5$, to which latter is also attached the platform $a^6$. $a^7$, is a reinforcing cleat attached to the under side of the platform $a^6$. $a^8$, is a metallic cross bar connecting the forward ends of the longitudinal side members $a$, $a$, of the frame. To this frontal cross bar $a^8$, is pivotally and centrally connected by the bolt $a^{81}$, the steering lever $a^9$, connected, as usual in this type of sled, with the forward part of the platform $a^6$, by link straps $a^{91}$, $a^{91}$, the rear ends of which are secured to the platform $a^6$, by a pivotal bolt $a^{10}$, as shown more particularly in Fig. 4, of the drawings. The above description applies to the usual and well known construction of the aforesaid flexible flyer type of sled to which my traction attachments are especially adapted.

My attachments appertain to the detachable mounting of the above named sled structure on running gear consisting essentially of a frontal steering wheel $s$, and two traction or drive wheels $t$, $t$, together with the means for controlling the steering wheel, and effecting the propulsion, manually, of the vehicle thus created, by the positive rotation of the said rear wheels, substantially as hereinafter set forth.

The steering wheel $s$, is mounted between the bifurcations $b'$, $b'$, of a bracket $b$, pivotally supported at $b^2$, and formed with a forwardly extending steering arm $b^3$, as shown more particularly in Figs. 4 and 7. The fulcrum $b^2$, for said bearing bracket $b$, is supported on a transverse bar $c$, detachably secured at its ends to the longitudinal side members $a$, $a$, of the sled frame by any suitable mechanical expedient, as by screw clips $c'$, $c'$, provided with nuts $c^2$, $c^2$, (Fig. 7) by which means said bar $c$, and the steering bracket $b$, may be readily positioned upon or removed from the sled frame. The forward end of the steering arm $b^3$, is pivotally and articularly connected by means of toggle links $d$, $d$, $d'$, $d'$, with the ends of the permanent steering lever $a^3$, of the sled structure heretofore set forth. When thus connected up with my steering attachment the said sled lever $a^3$, is utilized as a foot lever by the person seated on the platform $a^6$. That is to say, pressure applied at either end of said sled lever $a^3$, will be transmitted through either one or the other of the sets of toggle links $d$, $d'$, to the steering tongue $b^3$, of the pivoted bracket $b$, thereby shifting the latter in one direction or the other, and correspondingly changing the alignment of the steering wheel $s$, as related to the longitudinal axis of the sled medial between the runners $r$, $r$.

The traction power wheels $t$, are exteriorly mounted on the rear portions of the runners $r$, $r$, by means of a crank shaft $k$, journalled in bearing standards $e$, $e$, detachably secured to said runners as shown more particularly in Figs. 5 and 6, of the drawings, by which it will be seen that said bearing standards $e$, $e$, are formed with basic rectangular flanges $e'$, $e'$, which straddle the runners $r$, $r$, and are secured thereto by bolts $e^2$, $e^2$, and nuts $e^3$, $e^3$, although I do not restrict myself to this particular form and construction of clamping device, since it is obvious that any equivalent mechanical expedient may be substituted with like result.

The cranks $k'$, $k'$, of the driving shaft $k$, are pivotally connected by pitman rods $p$, $p$, with the lower ends of propulsion levers L, L, fulcrumed on a trunnion $v$, secured rigidly to a bracket loop $v'$, rigidly pendent from the under side of a bridge piece $w$, which is supported at its forward end on the fulcrum bolt $b^2$, aforesaid, and at its rear extremity is affixed by a screw $w'$, or equivalent means, to the cross member $a^4$, of the sled frame, as shown more particularly in Fig. 4.

The propulsion levers L, L, are preferably sectional in structure in that the handle sections $h$, $h$, are detachably coupled to the levers proper, i. e., the sections pivotally supported on the fulcrum $v$. In the construction shown in the drawings, and more particularly in Figs. 8 and 9 thereof, the handles $h$, $h$, are bifurcated at their lower extremities to straddle the fulcrum $v$, and are also formed with longitudinal slots $h'$, $h'$, for the accommodation of turn buttons $l$, $l$, which are pivotally connected with the upper arms of the levers L, L. Thus when the lower extremities of the handles $h$, $h$, are positioned to straddle the fulcrum $v$, and the turn buttons $l$, $l$, passed through the elongate slots $h'$, $h'$, and turned out of alignment with said slots, as illustrated in Fig. 8, the handles are temporarily locked in operative positions on the propulsion levers L, L, said handles $h$, $h$, extending upward above the platform $a^6$, so as to be conveniently accessible for manipulation by a person seated on the said platform $a^6$, as indicated particularly in Fig. 4, by reference to which figure, and also to Fig. 1, it will also be seen that the levers L, L, themselves are positioned entirely below the platform $a^6$, so that when the handles $h$, $h$, are detached from the levers L, L, as in Fig. 1, the sled is adapted to be steered by hand by a person lying on the platform $a^6$, as in the manner of use prior to the application of my attachments, except that the superstructure (the sled frame, etc.) now rests on the wheels $s$, $t$, $t$, instead of upon the runners $r$, $r$, as it did before the application of my attachments to the sled.

By my construction and arrangement of parts a sled can be quickly and conveniently transformed into a wheeled coaster, and as readily re-converted into sled form without detriment to the original structure, or to the attachable and detachable parts. For instance, the steering and propelling mechanism is held in place on the sled frame only by the nut $b^x$, on the pivotal bolt $b^2$, the clips $c'$, the screw $w'$, and the link bolts $a^x$, $a^x$, which, with the rear standard bolts $e^2$, $e^2$, constitute the whole means of attachment and detachment.

The convertible vehicle thus afforded is obviously adaptable for use at all times and seasons, which fact adds materially to its commercial value, as well as to its practical usefulness as a source of pleasure and amusement.

Furthermore, the detachable handles of the propelling levers adapt the converted vehicle for use by a person resting on the platform in either recumbent or seated position, as set forth.

It is to be understood that while I have herein shown and described a practical embodiment of my invention as applied to a sled of the character designated, I do not confine myself to minor details of construction, since various modifications may be resorted to, and equivalent mechanical expedients used, with like result, and without departing from the spirit and intent of my invention in this respect.

What I claim as my invention and desire to secure by Letters Patent is,

1. In combination with a sled of the character designated, and detachably mounted thereon, a frontal steering wheel mounted on a bifurcated bracket pivotally attached to the frame, said bracket pivotally connected by toggle links with a transverse steering lever on said frame, and rear traction wheels mounted on the runners, for the purpose described.

2. In combination with a sled of the character designated, and detachably mounted thereon, a frontal steering wheel mounted on a bifurcated bracket pivotally attached to the frame, said bracket pivotally connected by toggle links with a transverse steering lever medially fulcrumed on said frame, traction and propulsion wheels attached to a rear crank shaft mounted on and between the runners, propulsion levers mounted on a fixed fulcrum positioned on the forward part of the sled frame, and pitman rods pivotally connecting said levers with the cranks on said rear crank shaft, for the purpose described.

3. In combination with a sled of the character designated, and detachably mounted thereon, a frontal steering wheel pivotally connected with a steering lever on the sled frame, rear traction and propulsion wheels and a crank shaft mounted on and between the runners, propulsion levers mounted on a fixed fulcrum positioned on the forward part of the sled frame, and pitman rods pivotally connecting said levers with the cranks on said rear crank shaft, said propulsion levers being formed with detachable handles, for the purpose described.

4. In combination with a sled of the character designated provided with a frontal steering lever, of traction mechanism detachably mounted on said sled and comprising a frontal steering wheel journalled on a pivotally supported bracket and articularly connected with said sled steering lever by toggle links, rear traction and propulsion wheels and a crank shaft mounted on the runners, propulsion levers supported on a fixed fulcrum, and pitman rods connecting said levers with the cranks on said crank shaft, for the purpose described.

5. In combination with a sled of the character designated provided with a frontal steering lever, of traction mechanism detachably mounted on said sled and comprising a frontal steering wheel journalled on a pivotally supported bracket and articularly connected with said sled steering lever by toggle links, rear traction and propulsion wheels and a crank shaft mounted on the runners, propulsion levers supported on a fixed fulcrum, and pitman rods connecting said levers with the cranks on said crank shaft, said propulsion levers being formed with detachable handles, for the purpose described.

6. In combination with a sled of the character designated provided with a frontal steering lever, of traction mechanism detachably mounted on said sled and comprising a frontal steering wheel journalled on a pivotally supported bracket and articularly connected with said sled steering lever by toggle links, rear traction and propulsion wheels and a crank shaft mounted on the runners, propulsion levers supported on a fixed fulcrum, and pitman rods connecting said levers with the cranks on said crank shaft, said propulsion levers having detachable handles formed with fulcrumed inner ends which straddle the lever fulcrum and with longitudinal slots for the accommodation of turn buttons on the upper portions of said levers, together with said turn buttons, for the purpose described.

CHARLES METZGER.

Witnesses:
DOROTHY MIATT,
GEO. WM. MIATT.